W. M. NECKERMAN & C. A. BLICE.
THREADING MACHINE.
APPLICATION FILED MAR. 24, 1913.
1,085,697.
Patented Feb. 3, 1914.
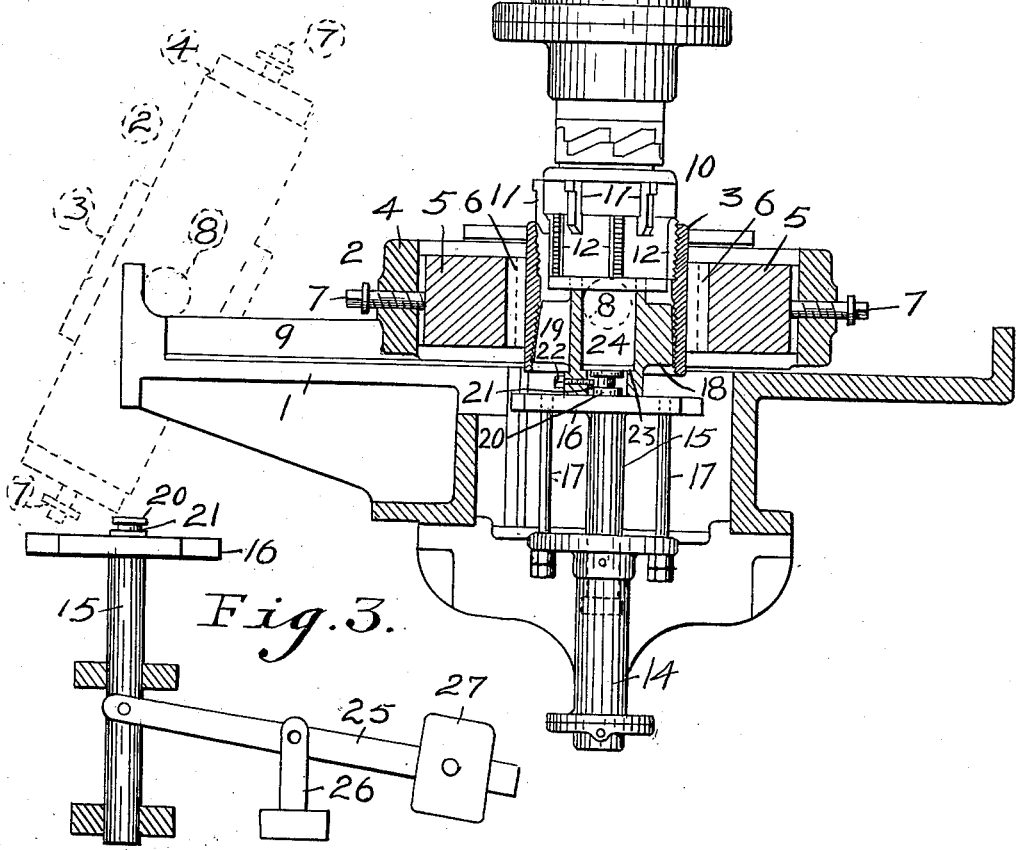

UNITED STATES PATENT OFFICE.

WILLIAM M. NECKERMAN AND CARL A. BLICE, OF YOUNGSTOWN, OHIO, ASSIGNORS TO THE YOUNGSTOWN SHEET AND TUBE COMPANY, OF YOUNGSTOWN, OHIO, A CORPORATION OF OHIO.

THREADING-MACHINE.

1,085,697.   Specification of Letters Patent.   Patented Feb. 3, 1914.

Application filed March 24, 1913. Serial No. 756,285.

*To all whom it may concern:*

Be it known that we, WILLIAM M. NECKERMAN and CARL A. BLICE, citizens of the United States, residing at Youngstown, in the county of Mahoning and State of Ohio, have invented new and useful Improvements in Threading-Machines, of which the following is a specification.

Our invention relates to threading machines and is particularly adapted to the threading of pipe couplings.

It is the object of our invention to provide a threading machine for coupling by which the axial centers of the threaded ends thereof shall be in alinement.

Other objects appear hereinafter.

Referring to the accompanying drawings, Figure 1 is a fragmentary view showing our invention in central vertical section; Fig. 2, a plan of the chuck jaws and the centering head; and Fig. 3, an elevation showing a modification of Fig. 1.

1 represents a horizontal table which forms a support and guideway for the chuck 2 adapted to grip the coupling 3 and hold the same in substantially a vertical position. The chuck 2 is preferably of the floating type, that is, of the type that may move horizontally in any and all directions in order that the coupling in the chuck may be accurately centered with respect to the tap. As floating chucks are well known a brief description will suffice.

4 represents the frame of the chuck. It rests on the table 1 and contains the two jaws 5 between opposite sides thereof, the jaws standing opposite each other and provided with teeth 6 for engaging the coupling. The screws 7 in the sides of the frame work against the outer edges of the jaws 5 to force the jaws toward the coupling. The frame is provided with trunnions 8 (shown in dotted lines), on which the chuck may be slid to one side of the table and reversed or turned bottom side up, the trunnions sliding on the top of the guides 9 (only one shown). The apparatus so far described is old and well known.

10 is a vertical rotary tap having the reamers 11 and the collapsible threading dies 12, the tap being supported and rotated by the shaft 13, driven in any suitable manner. The tap may be any tap that will operate to thread the interior of the upper end of a coupling held in the grip of the chuck, but we prefer to employ the tap shown in the application of William M. Neckerman, Serial Number 733,246, filed November 25th, 1912.

14 is a vertical hydraulic or other power cylinder, situated below the table in line with the shaft 13 and having the piston rod 15 carrying on its upper end the rest 16 guided by the vertical rods 17.

18 is the centering plug which is circular in cross section and is supported on the rest 16. This plug has its periphery tapered upwardly and its diameter so made that it will engage and fit against the tapered threads on the interior of the lower end of the coupling 3. The periphery of the plug is cut away at a number of places to form clearance openings 19 for the chips made by the threading dies and reamers of the tap.

The centering plug 18 has a limited movement in any and all horizontal directions to enable it to center itself accurately in the lower end of the coupling. This limited movement may be secured in many ways, but we prefer to employ the stud 20 rigid with the top of the rest 16 and provided with a circumferential groove 21 to receive the screw 22 in the boss on the lower end of the plug, this boss having a central opening to receive the stud 20. The opening for the stud is made somewhat larger than the stud to provide for the said limited movement of the plug. The inner end of the screw 22 is sufficiently short to permit the plug to move without hindrance therefrom and yet long enough to pull the plug down when the rest 16 falls.

The centering plug 18 is provided with the central vertical opening 24 open at its upper end and having its axial center in vertical alinement with the axial center of the tap. The bottom of the tap 10 has the downwardly extending projection or centering pin 24 arranged in axial alinement with the axis of the tap and adapted to fit the opening 23.

An unthreaded coupling is gripped in the chuck 2 and slid centrally beneath the tap 10, which, being in rotation, is fed down in a well known manner into the coupling, whereby the upper end of the coupling is threaded internally. The centering plug 18 may be raised into the lower end of the coupling prior to the threading operation, if desired, to assist centering the coupling.

After the upper end of the coupling has been threaded, the dies 12 are collapsed and the tap 10 raised out of the coupling, and the plug 18 lowered below the chuck, if it has been lifted into the coupling. The chuck with the coupling still gripped therein is slid along the guides 9 to the position shown in dotted lines, where it is inverted or turned bottom side up. After the reversal of the chuck, it is returned to its position beneath the tap 10. The piston 15 is then raised and the plug 18 caused to enter the lower end of the coupling. The plug engages the threads on the coupling, so that, when the projection 24 enters the opening 23, the axial center of the threaded lower end of the coupling is in alinement with the axial center of the tap 10 and with the axial center of the threads which the tap will cut in the upper end of the coupling. When the tap engages the centering plug, the latter may be allowed to move down by exhausting fluid from the cylinder 14.

If the centering plug were omitted from our machine, the axes of the two threaded ends might not be in alinement. They would be out of alinement in case the coupling should not be held by the chuck with its axial center in exact alinement with the tap, in which case the axial center of the other end when threaded would make an angle with the axial center of the end first threaded, twice as great as the angle which the latter axial center made with the axial center of the coupling. By the use of the centering plug, the axial centers of both of the threaded ends must be in alinement.

On Fig. 3, we have shown the rest 16 actuated by the lever 25, having one end pivoted to the rod 15', its intermediate portion pivoted on the support 26, and its remaining end provided with the adjustable weight 27, the weight being preferably heavy enough to lift the plug into the coupling. When the tap engages the plug on the rest 16, the latter readily yields, as is clearly apparent. The lever 25 may be operated manually to lower the plug below the table.

We do not limit ourselves to the operating and supporting means shown for the centering plug as many expedients for these purposes will readily suggest themselves to those familiar with mechanical devices.

We claim—

1. In a threading machine for couplings, a floating chuck for gripping the coupling, a tap for internally threading one end of the coupling, a centering plug adapted to engage the inner wall of the remaining end of the coupling, and means coöperating with the tap and the centering plug for maintaining them in axial alinement.

2. In a threading machine for couplings, a floating chuck for gripping the coupling, a tap for internally threading the ends of the coupling, a centering plug having a smooth exterior surface shaped to conform to the interior of an already threaded end of the coupling, and mutually coöperating means for holding the plug and tap in axial alinement.

3. In a threading machine for couplings, a reversible chuck for the coupling, a tap for threading the interior of the ends of the coupling singly, a centering plug adapted to engage the interior of the end of the plug opposite the tap and insure the axial alinement of the plug and the interior of the said end of the coupling, means for holding the plug in the end of the coupling, and means for insuring the axial alinement of the plug and tap.

4. In a threading machine for couplings, a reversible chuck for the coupling, a tap for threading the interior of the ends of the coupling singly, a centering plug adapted to engage the interior of the end of the plug opposite the tap and insure the axial alinement of the plug and the interior of the said end of the coupling, means for operating and holding the plug in the end of the coupling, and means for insuring the axial alinement of the plug and tap.

Signed at Youngstown, Ohio, this 19th day of March, 1913.

WILLIAM M. NECKERMAN.
CARL A. BLICE.

Witnesses:
W. T. LAWTHERS,
E. T. McCLEARY.

---

Copies of this patent may be obtained for five cents each, by addressing the "Commissioner of Patents, Washington, D. C."